(12) United States Patent
Faronius et al.

(10) Patent No.: US 10,742,301 B2
(45) Date of Patent: Aug. 11, 2020

(54) NETWORK NODE AND METHOD PERFORMED THEREBY FOR SCHEDULING TRANSMISSIONS BETWEEN THE NETWORK NODE AND ONE OR MORE WIRELESS DEVICES

(71) Applicant: TELEFONAKTIEBOLAGET LM ERICSSON (PUBL), Stockholm (SE)

(72) Inventors: Carola Faronius, Järfälla (SE); Bo Göransson, Sollentuna (SE); Fredrik Huss, Sundbyberg (SE); Magnus Lundevall, Sollentuna (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/477,562

(22) PCT Filed: Jan. 18, 2017

(86) PCT No.: PCT/SE2017/050041
§ 371 (c)(1),
(2) Date: Jul. 12, 2019

(87) PCT Pub. No.: WO2018/135982
PCT Pub. Date: Jul. 26, 2018

(65) Prior Publication Data
US 2019/0372646 A1    Dec. 5, 2019

(51) Int. Cl.
*H04B 7/06* (2006.01)
*H04W 52/24* (2009.01)

(52) U.S. Cl.
CPC ......... *H04B 7/0695* (2013.01); *H04B 7/0632* (2013.01); *H04B 7/0639* (2013.01); *H04W 52/241* (2013.01)

(58) Field of Classification Search
CPC .. H04B 7/0695; H04B 7/0632; H04B 7/0639; H04W 52/241; H04W 72/0446; H04L 5/0037
See application file for complete search history.

(56) References Cited

U.S. PATENT DOCUMENTS

| 2010/0165914 A1* | 7/2010 | Cho | H04B 7/0695 370/328 |
| 2014/0226453 A1* | 8/2014 | Harel | H04B 7/0413 370/201 |

FOREIGN PATENT DOCUMENTS

WO    2015195375 A1    12/2015

* cited by examiner

*Primary Examiner* — David S Huang
(74) *Attorney, Agent, or Firm* — Sage Patent Group

(57) ABSTRACT

A network node and a method performed by the network node for scheduling transmissions between the network node and one or more wireless devices in the same physical layer resources are provided. The method comprises selecting a beam for a transmission between the network node and a first one of the wireless devices; and determining if a portion of physical layer resources remains available after allocating portions of physical layer resources to a first set of one or more wireless devices within transmission range of the selected beam. The method further comprises if at least a portion of physical layer resources remains available, adjusting the selected beam such that a second set of one or more additional wireless devices not within transmission range of the initially selected beam are within transmission range of the adjusted beam.

17 Claims, 8 Drawing Sheets

NETWORK NODE AND METHOD PERFORMED THEREBY FOR SCHEDULING TRANSMISSIONS BETWEEN THE NETWORK NODE AND ONE OR MORE WIRELESS DEVICES

This application is a 371 of International Application No. PCT/SE2017/050041, filed Jan. 18, 2017, the disclosure of which is fully incorporated herein by reference.

TECHNICAL FIELD

The present disclosure relates to wireless communication and in particular to scheduling transmissions between a network node and one or more wireless devices.

BACKGROUND

In the $5^{th}$ generation, 5G, wireless systems in standardisation, beamforming and Multiple Input Multiple Output, MIMO, transmission will be central technologies. Increasing capacity requirements is driving this development where more and more MIMO transmission is introduced in existing frequency bands. However, this will soon become insufficient, thereby requiring migration into spectrum at higher carrier frequencies, starting at 3.5-5 GHz, continuing to the soon available 28 GHz band and beyond, towards 60 GHz. For these higher bands, beamforming with massive antenna arrays, in the end with hundreds of elements, will be needed to compensate for the worsening radio propagation. At these higher frequencies cost, size and power constraints will also prevent the AD/DA (Analogue Digital/Digital Analogue) conversion towards individual antenna elements, thereby most probably restricting solutions to so called analogue beamforming, or possibly hybrid beamforming with a few signal layers (perhaps 2-8) that can be used for multi-user access (over time and frequency).

At the same time the dominating multi-user access technology for 5G is expected to become some variant of Orthogonal Frequency Division Multiple Access, OFDM. As is well known, this access is associated with a resource grid, divided in time and frequency, see FIG. 2a. When multi layered (MIMO) transmission is used, there is one overlaid resource grid per layer, separated by spatial pre-coding.

With analogue beamforming there is only a limited number of digital signal chains that may use pre-coding, one per antenna port (assuming the number of antenna ports being equal to the number of layers). The advantage is that the signals to the many more antenna elements are then distributed by analogue signals (or at least not individually pre-coded signals). As a consequence the AD/DA and the internal interface capacities needs are minimised. A disadvantage may be that the beam steering is done by adjusting phase and possible amplitude weights before the antenna elements, thereby setting up a fixed beam pattern that remains valid during the whole symbol. If this beam is "narrow", which it is has to be to reach maximum throughput and/or to counter the propagation effects to reach cell-edge wireless devices at high carrier frequencies, this means that the transmitted signal energy can only be directed in one direction, per symbol time (assuming 1 layer transmission). Since also pre-coded wireless devices using additional layers would be attenuated by this beam unless they are aligned to it, the consequence is that pure high gain analogue beam forming is restricted to single, or a few wireless device scheduling, per symbol time.

Different applications have very different needs when it comes to the transmission rate. Voice traffic e.g. requires <1 kbit/20 ms, whereas video download has a more or less unlimited bit rate need. Therefore, to avoid wasted capacity it is essential that the number of sub-carriers and the symbol time allows a fine enough granularity in terms of the total number of bits when combined.

The $3^{rd}$ Generation Partnership Project, 3GPP, 5G standardisation seems to become based on a re-scaling of the 4G LTE resource grid, at least to some extent. This interface has a maximum bit rate per OFDM symbol of roughly 100000 bits, which is about 100 times larger than what is needed for RRC signalling, Transport Control Protocol, TOP, acknowledgement, ACK, or voice services. In this case most of the available resources would be wasted when applying analogue beam forming, see FIG. 2b. Recently a finer time division has relaxed this waste to some extent, however a fine time granularity is usually coupled to a short latency which in turn requires quicker computations that drive the HW requirements. Thus the problem addressed by the invention persists.

SUMMARY

The object is to obviate at least some of the problems outlined above. In particular, it is an object to provide a network node and a method performed thereby for scheduling transmissions between the network node and one or more wireless devices in the same physical layer resources using analogue beamforming. These objects and others may be obtained by providing a network node and a method performed by a network node according to the independent claims attached below.

According to an aspect, a method performed by a network node for scheduling transmissions between the network node and one or more wireless devices in the same physical layer resources is provided. The network node uses beamforming for transmissions between the network node and the one or more wireless devices. The method comprises selecting a beam for a transmission between the network node and a first one of the wireless devices; and determining if a portion of physical layer resources remains available after allocating portions of physical layer resources to a first set of one or more wireless devices within transmission range of the selected beam. The method further comprises if at least a portion of physical layer resources remains available, adjusting the selected beam such that a second set of one or more additional wireless devices not within transmission range of the initially selected beam are within transmission range of the adjusted beam. Still further, the method comprises if no portion of physical layer resources remains available after allocating portions of physical layer resources to the first and second set of wireless devices and if there are enough physical layer resources for transmission between the network node and the first and second sets of wireless devices using the adjusted beam: scheduling transmissions between the network node and the first and second sets of wireless devices using the adjusted beam.

According to an aspect, a network node for scheduling transmissions between the network node and one or more wireless devices in the same physical layer resources is provided. The network node uses beamforming for transmissions between the network node and the one or more wireless devices. The network node is configured for selecting a beam for a transmission between the network node and a first one of the wireless devices: and determining if a portion of physical layer resources remains available after allocating portions of physical layer resources to a first set of one or more wireless devices within transmission range of the selected beam. The network node is further configured for: if at least a portion of physical layer resources remains available, adjusting the selected beam such that a second set of one or more additional wireless devices not within transmission range of the initially selected beam are within transmission range of the adjusted beam. Still further, the network node is configured for: if no portion of physical layer resources remains available after allocating portions of physical layer resources to the first and second set of wireless devices and if there are enough physical layer resources for transmission between the network node and the first and second sets of wireless devices using the adjusted beam: scheduling transmissions between the network node and the first and second sets of wireless devices using the adjusted beam.

The network node and the method performed by the network node have several advantages. One possible advantage is that the usage of the air interface is flexible and efficient. This is hence achieved by the fact that additional wireless devices may be scheduled in the same time instant, than what would have been possible without the invention. In this way more wireless devices may be served per time unit, a fact that is also beneficial to keep the round trip latency low, in more heavily loaded situations than would be possible without the invention.

BRIEF DESCRIPTION OF DRAWINGS

Embodiments will now be described in more detail in relation to the accompanying drawings, in which.

DETAILED DESCRIPTION

Figure 2A:
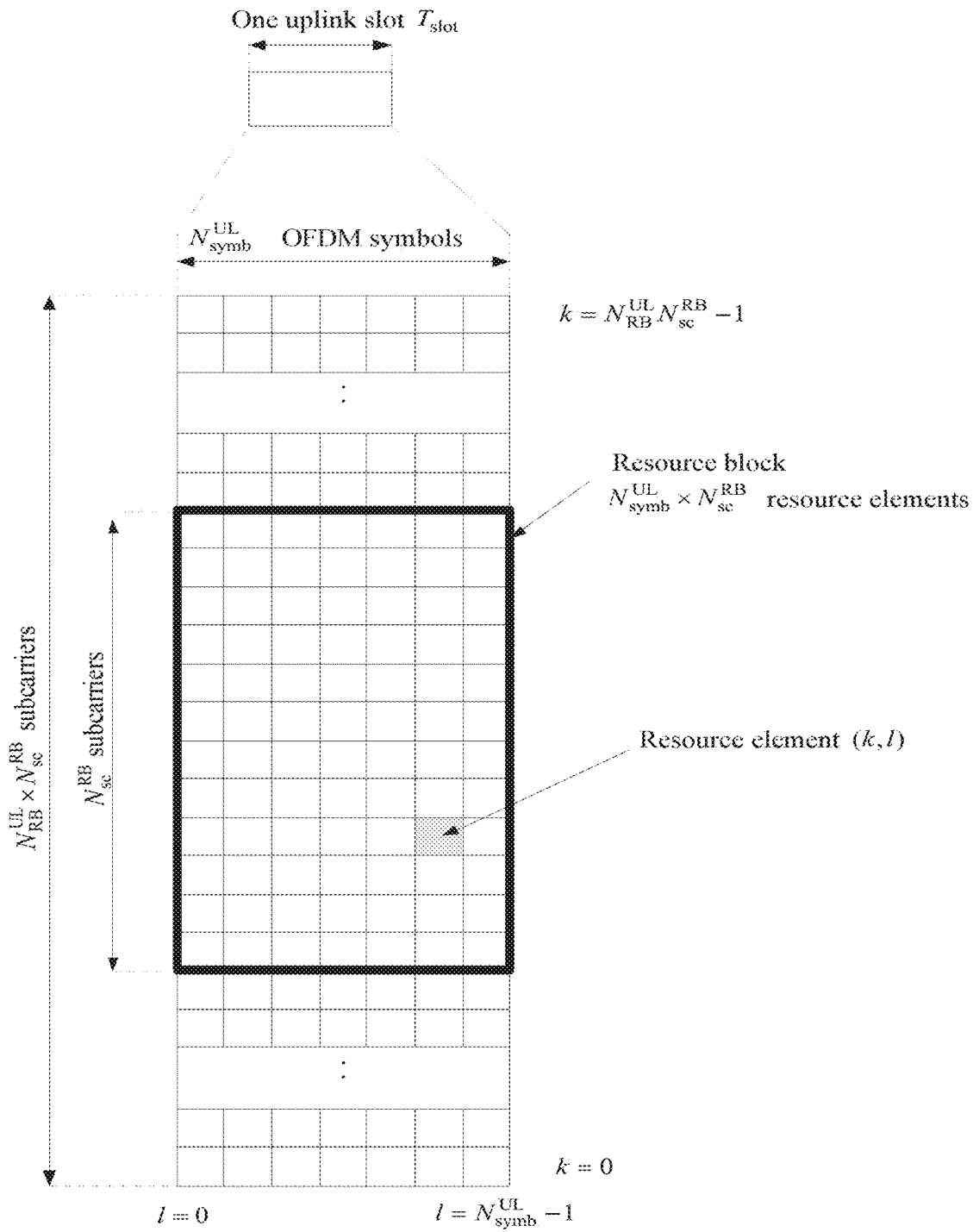
FIG. 2a is an illustrative example of a resource grid.

In case of analogue beamforming, the analogue transmit signal may be sent to a set of antenna elements. The phase shift of each antenna in a set is then controlled in a way to create the radio beam, see FIG. 2c. The advantage of this solution is e.g. that the digital to analogue conversion does require a number of AD/DA converters that is equal to the number of spatial multiplexing layers. In addition, the number of internal digital data streams from the pre-coding entity to the expansion point near the antenna elements is reduced, resulting in complexity and cost reductions. The number of converters/digital data streams is likely to be much lower than the number of antenna elements, since the majority of the degrees of freedom are anyway to be used for beamforming. A downside is a lack of flexibility in that all resource blocks of a symbol are subject to the same beamforming. This is only consistent with the scheduling of users (wireless devices) in a single direction per beam, at each time instant and for all frequencies of the band. It is noted that phase shifting beam control can be only phase shifting beam control or phase shifting and amplitude gain beam control. So phase shifting beam control in FIG. 2c covers both alternatives.

The 3GPP 5G time-frequency granularity is adapted to digital beamforming and is too coarse to support low data rate users with good spectral efficiency, when analogue beamforming is used at high carrier frequencies. At the same time the granularity with WIFI seems to be significantly finer according to present standardisation ideas.

There are no standardised solutions, except frequency selective spatial multiplexing, that allow a significant amount of wireless devices to be simultaneously scheduled for transmission on one single OFDM symbol (this being the finest time granularity assumed in this disclosure).

There are no analogue beamforming techniques available that adjust the antenna gain to the link requirements, simultaneously for multiple users on a single OFDM symbol.

Often, beamforming patterns are computed as optimal beamforming patterns, which lead to increased complexity in implementation, calibration, testing and cost. This disclosure focuses on a low complexity analogue beamforming solution where the beam pattern may be fixed in the radio, and selected from this pre-stored and fixed set of beam patterns.

Embodiments herein relate to a method performed by a network node using beamforming for scheduling transmissions between the network node and one or more wireless devices in the same physical layer resources. The network node is operable in a wireless communication system. Different embodiments of such a method will now be described with reference to FIGS. 1a-1b.

Figure 1A:
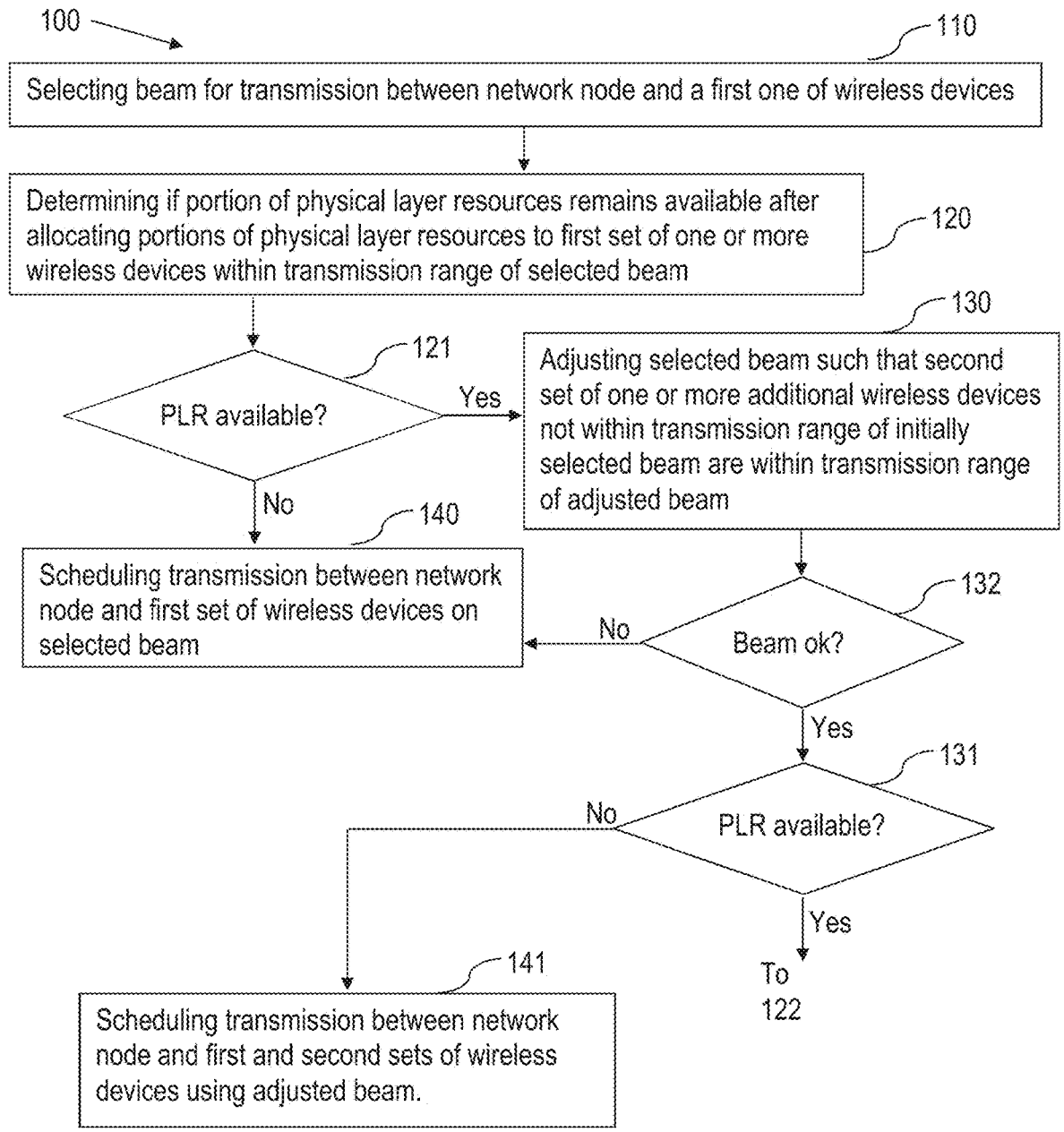
FIG. 1a is a flowchart of a method performed by a network node for scheduling transmissions between the network node and one or more wireless devices in the same physical layer resources, according to an exemplifying embodiment.

FIG. 1a illustrates the method comprising selecting 110 a beam for a transmission between the network node and a first one of the wireless devices; and determining 120 if a portion of physical layer resources remains available after allocating portions of physical layer resources to a first set of one or more wireless devices within transmission range of the selected beam. The method further comprises if at least a portion of physical layer resources remains available, adjusting 130 the selected beam such that a second set of one or more additional wireless devices not within transmission range of the initially selected beam are within transmission range of the adjusted beam. Still further, the method comprises if no portion of physical layer resources remains available after allocating portions of physical layer resources to the first and second set of wireless devices and if there are enough physical layer resources for transmission between the network node and the first and second sets of wireless devices using the adjusted beam: scheduling 141 transmissions between the network node and the first and second sets of wireless devices using the adjusted beam.

Different beams have different shapes and different directions. The shapes of individual beams are obtained by a plurality of antennas or antennas arrays at the transmitter, consequently, individual shapes are associated with respective "positions" of the antennas, antenna elements or antenna arrays. Depending on where various wireless devices are located within a cell, also known as a coverage area, of the network node, one or more wireless devices may be reached by, i.e. is/are within a coverage area of a beam, wherein the network node may perform a transmission to one or more wireless devices using one beam. Analogously, the network node may receive transmission(s) from the same one or more wireless devices by having the antennas, antenna elements or antenna arrays in a position associated with the beam. See also FIG. 2d.

A transmission to/from one or more wireless devices is associated with an amount of physical layer resources of a channel by means of which the transmission is performed. Generally, the amount of physical layer resources per transmission is fixed and is independent of the beam and the form of the beam. With a "narrow" beam, meaning that it is optimised or formed with regards to one specific wireless device, it is likely that very few other wireless devices may be within the coverage area of that beam. However, the "narrow" beam increases the likelihood for the transmission between the network node and the wireless device to be successful and the wireless device is enabled to use all the physical layer resources of the transmission. However, in case there is less data to be transmitted between the network node and the wireless device than there is physical layer resources of the transmission, the additional physical layer resources of the transmission will be wasted. Consequently, there is a risk of a waste of resources when the network node performs a transmission to one or more wireless devices and/or when one or more wireless devices perform a transmission to the network node.

In order to overcome such scenarios, the network node first selects 110 a beam for a transmission between the network node and a first one of the wireless devices. The beam is associated with respective "positions" of the antennas or antenna arrays to form the beam. The beam is for performing a transmission to and/or receiving the transmission from one or more wireless devices.

The network node then determines 120 if a portion of physical layer resources remains available after allocating portions of physical layer resources to the first set of one or more wireless devices within transmission range of the selected beam. The selected beam has a specific form based on the respective "positions" of the antennas or antenna arrays to form the beam. The form of the beam covers an area of the cell of the network node. There may be one or more wireless devices within the coverage area of the beam. Either the network node has data to send to the wireless device(s) of the first set of wireless devices or the wireless device(s) of the first set of wireless devices has indicated that they have data to send to the network node. The network node may then compare the amount of data that is to be transmitted between the network node and the first set of wireless devices. The amount of data corresponds to a certain amount of physical layer resources, wherein the certain amount of physical layer resources that is needed for transmitting the amount of data may depend on different things e.g. Modulation and Coding Scheme, MSC, used for the transmission. Either the amount of data takes up all, or close to all, physical layer resources or there is a portion of physical layer resources left.

If at least a portion of physical layer resources remains available, see e.g. 121 of FIG. 1a, those physical layer resources may be wasted. In order to not unnecessarily waste physical layer resources, the network node adjusts 130 the selected beam, thereby changing its shape. By changing its form or shape, its coverage area is changed and possible one or more additional wireless devices may be found within the coverage area of the adjusted beam. The changed shape/from of the beam is such that it still covers the previous beam. In other words, one or more additional wireless devices (also referred to as the second set of wireless devices) may be within transmission range of the adjusted beam in addition to the first set of wireless devices.

The network node may determine if the transmission can accommodate all the wireless devices of both the first and the second set of wireless devices, see 132 of FIG. 1a. By accommodating a wireless device means that the transmission incorporates data to be transmitted between the network node and the wireless device. It can be noted here that since the antenna gain corresponding to the beam for the first wireless device has now changed, new Modulation and Coding Scheme, MCS, information needs to be calculated also for the first wireless device—typically more coding will be needed. The second set of wireless devices reachable by the adjusted beam may have more or less data to send to the network node or the network node may have more or less data to send to the wireless devices of the second set. In the same manner as above, the network node may determine if a portion of physical layer resources remains available after allocating portions of physical layer resources to the first and second set of respective one or more wireless devices within transmission range of the adjusted beam, see 131 of FIG. 1a.

If there are enough physical layer resources for transmission between the network node and the first and second sets of wireless devices using the adjusted beam, in step 132 of FIG. 1a, this results in taking the "Yes" option, the network node may schedule 141 the transmission between the network node and the first and second sets of wireless devices using the adjusted beam. As will be explained in more detail below, the adjusted beam may require a reduction in code rate, e.g. by means of an adjusted MCS, in order to compensate for a possible worse SINR as compare to the initially selected beam. Consequently, the data or information of the transmission may require more resources using the adjusted beam for the transmission than using the initially selected beam.

Also, if there are no more resources left, i.e. if no portion of physical layer resources remains available after allocating portions of physical layer resources to the first and second set of wireless devices, the beam cannot be further adjusted so there is no reason for the network node to further adjust the beam in order to change its form or shape. In step 131 of FIG. 1a, this results in taking the "No" option.

The method performed by the network node has several advantages. One possible advantage is that the usage of the air interface is flexible and efficient. This is hence achieved by the fact that additional wireless devices can be scheduled in the same time instant, than what would have been possible without the invention. In this way more wireless devices may be served per time unit, a fact that is also beneficial to keep the round trip latency low, in more heavily loaded situations than would be possible without the invention.

The method may further comprise scheduling 140 transmissions between the network node and the first set of wireless devices using the initially selected beam if a portion of physical layer resources is not available after allocating portions of physical layer resources to the first set of one or more wireless devices within transmission range of the selected beam.

It may happen that the adjusted beam may not be suitable for the transmission between the first and second set of respective one or more wireless devices, in step 132 of FIG. 1a, this results in taking the "No" option. For example, the amount of physical layer resources needed for the transmission of data associated with the first set of wireless devices may increase when the beam is adjusted. The initially selected beam may be optimised for the first set of one or more wireless devices, wherein for example the MCS may be less aggressive thereby causing less overhead. When the beam is adjusted, the MCS may have to be changed in order to successfully perform the transmission. It may be that there are not enough physical layer resources to perform the transmission using the adjusted beam. It may also be that it is not possible to decrease the code rate, i.e. changing the MCS, due to standard limitations.

In such a case, the network node reverts to the initially selected beam and schedules 140 the transmission between the network node and the first set of wireless devices using the initially selected beam.

The selecting 110 of the beam may comprise selecting the beam based on a channel quality of a link the selected beam provides between the network node and the first wireless device.

There may be different criteria for selecting the beam. The network node may look at the channel quality of the link the selected beam provides. The better the link, the less overhead is needed, the more data may be transmitted and the higher the likelihood that the transmission will be successful.

The determining 120 if a portion of the physical layer resources would remain available after an allocation of available physical layer resources may be based on at least one of (a) channel quality, and (b) available power and antenna resources.

Once the network node has allocated available physical layer resources, the network node determines if a portion of physical layer resources remains available as described above.

The network node may look at (a) channel quality, wherein e.g. different MCS may need to be used in order to match the channel quality. As described above, depending on the channel quality, a more or less aggressive MCS may be needed in order to ascertain that the transmission is likely to be successful.

The network node may also, or alternatively, look at (b) available power and antenna resources. Merely as an illustrative and non-limiting example, the network node may have to increase its transmit power using the adjusted beam. It may be that the necessary increase in transmission power is larger than possible or allowed, whereby the adjusted beam cannot be used for the transmission. In another non-limiting example, there may not be enough antenna resources of the network node to form the adjusted beam, whereby the adjusted beam cannot be used for the transmission.

Figure 1B:
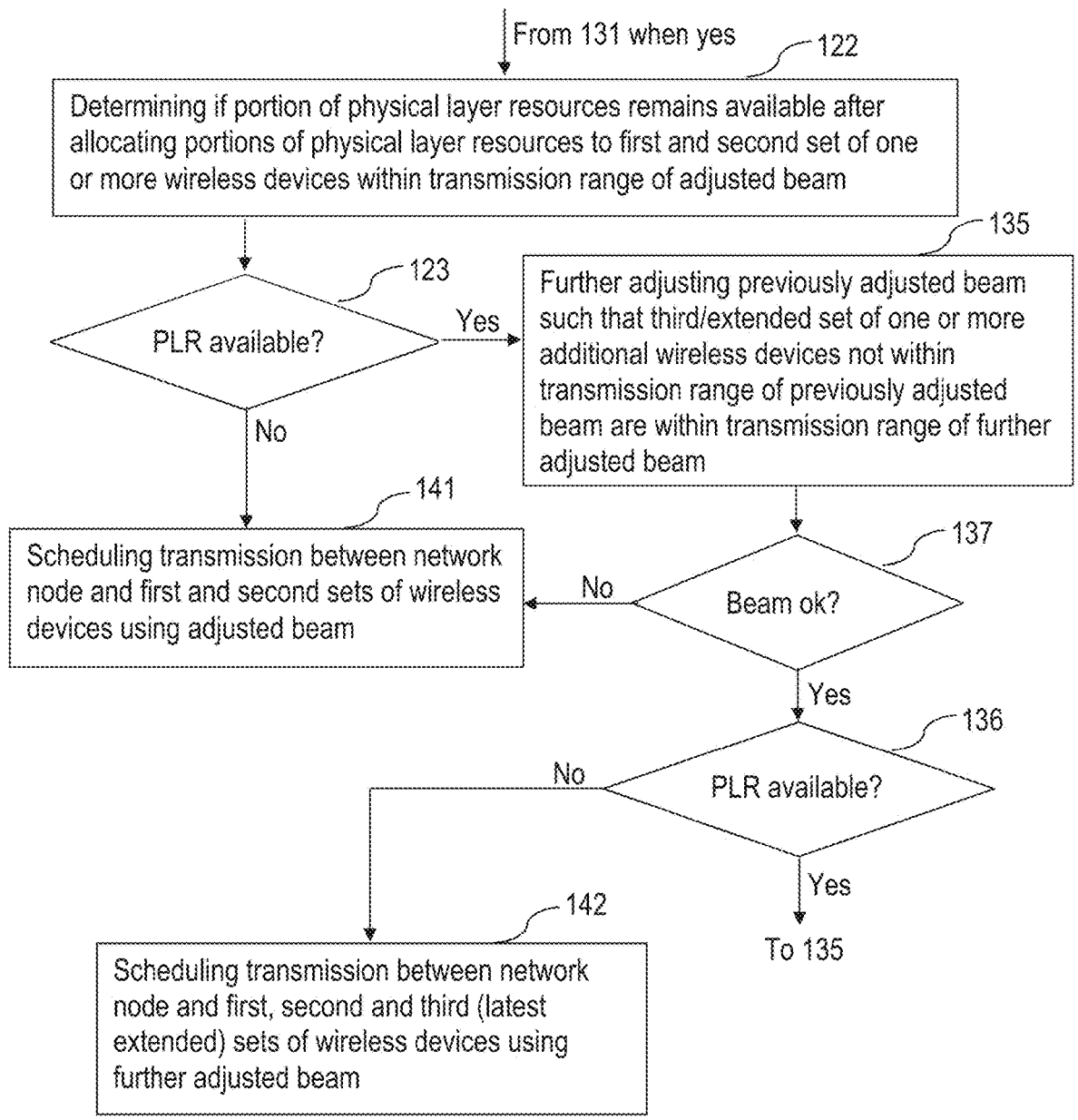
FIG. 1b is a flowchart of a method performed by a network node for scheduling transmissions between the network node and one or more wireless devices in the same physical layer resources, according to another exemplifying embodiment.

The method may further comprise, as illustrated in FIG. 1b, determining 122 if a portion of physical layer resources of the time resource remains available after allocating portions of physical layer resources to the first and second set of one or more wireless devices within transmission range of the adjusted beam. If at least a portion of physical layer resources remains available, further adjusting 135 the previously adjusted beam such that a third set, which may also be referred to in general, as one or more extended sets, of one or more additional wireless devices not within transmission range of the previously adjusted beam are within transmission range of the further adjusted beam. Further, scheduling 142 transmission(s) between the network node and the first, second and third (all extended) sets of wireless devices using the further adjusted beam if no portion of physical layer resources remains available and if there are enough physical layer resources for transmission between the network node and the first, second and third (all extended) sets of wireless devices using the further adjusted beam.

Figure 2B:
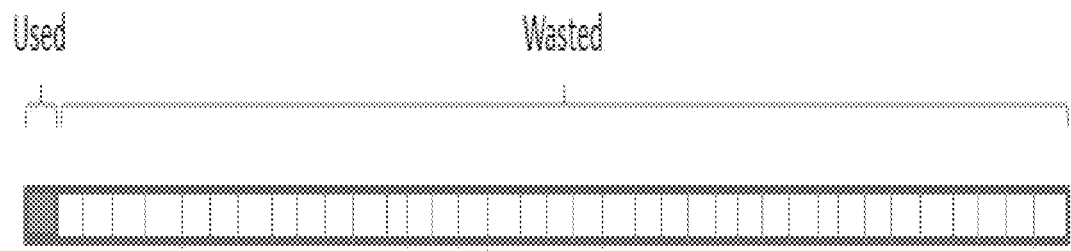
FIG. 2b is an illustration of capacity waste with analogue beamforming.
Figure 2C:
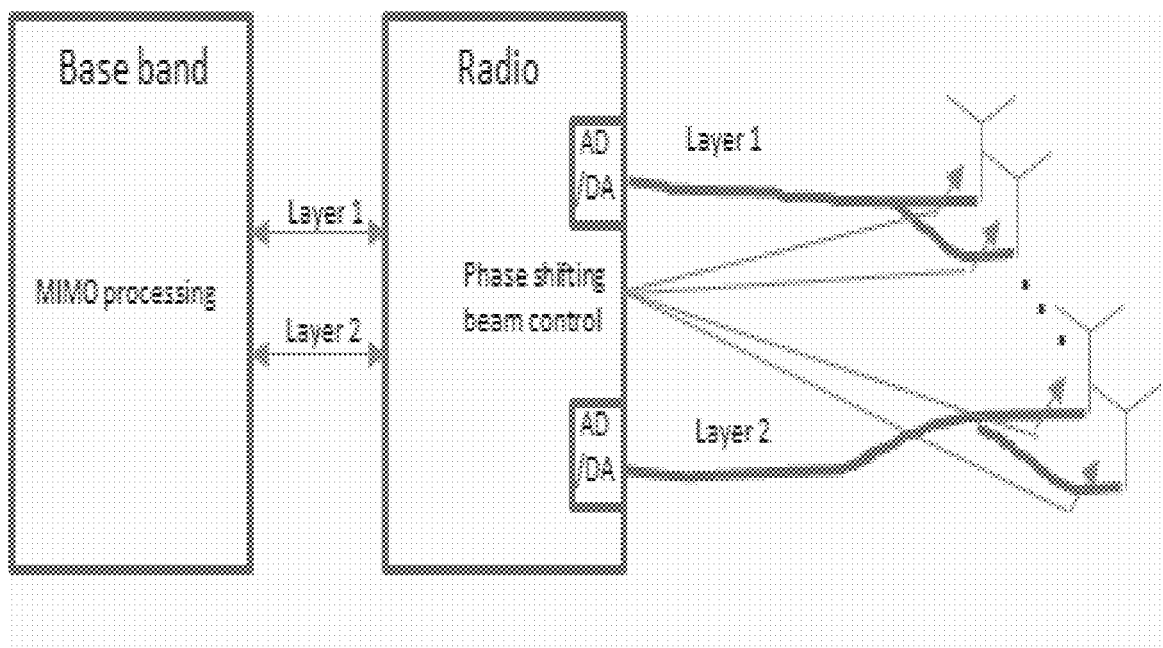
FIG. 2c is an illustration of an exemplifying arrangement for analogue beamforming.
Figure 2D:
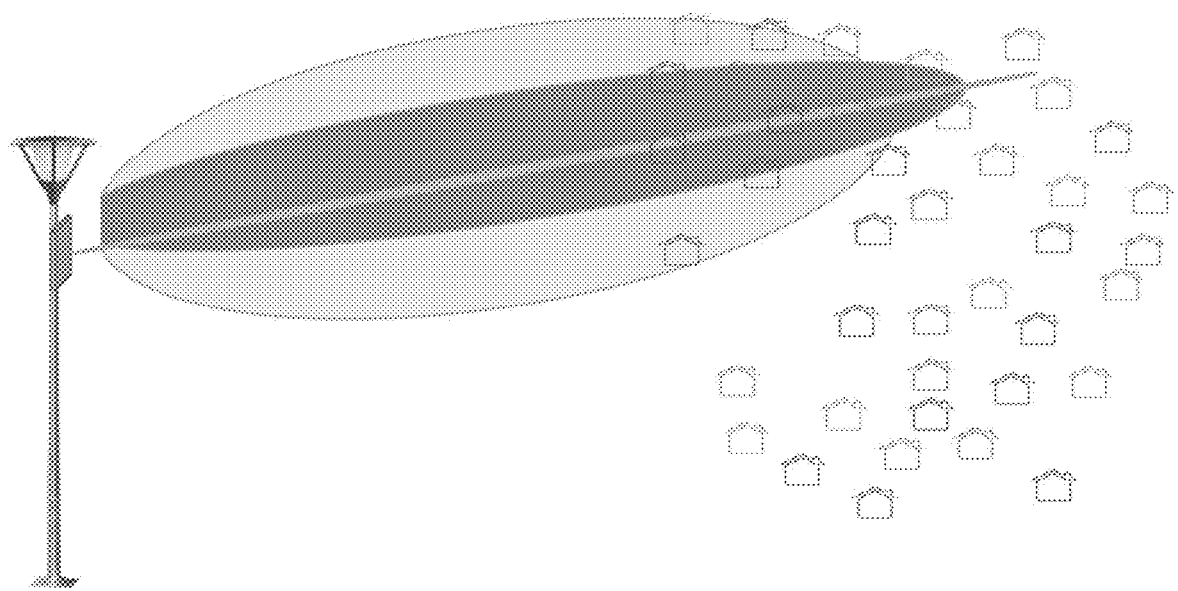
FIG. 2d is an illustration of beam selection.

Depending on e.g. the amount of data associated with the wireless devices of the second set, there may be even more physical layer resources left after allocation of wireless devices in both the first and the second set of respective one or more wireless devices, option "Yes" of step 123 in FIG. 2b. If that is the case, the network node may further adjust 135 the previously adjusted beam, thereby changing/expanding its shape or form so that the further adjusted beam has a coverage area encompassing any previous beam and an area of the cell not previously covered by previous beams. In this manner, the further adjusted mean may be used to reach the third (and/or extended) sets of one or more additional wireless devices.

In the same manner as above, the network node may determine if the transmission can accommodate all the wireless devices of both the first, second and the third (all extended) set(s) of wireless devices using the further adjusted beam, option "Yes" in step 137 in FIG. 2b, and also if there is still a portion of physical layer resources left after allocating the wireless devices of the first, the second and the third (all extended) set(s) of respective one or more wireless devices, step 136 in FIG. 2b.

If there are enough physical layer resources for accommodating the wireless devices of the first, the second and all extended sets of respective one or more wireless devices in the transmission with the further adjusted beam, option "Yes" in step 137 in FIG. 2b, but there are not enough physical layer resources for any further wireless devices, option "No" in step 136 in FIG. 2b, the network node may schedule 142 the transmission between the network node and the first, the second and the third (all extended) set(s) of wireless devices using the further adjusted beam.

In FIG. 2b, when there enough physical layer resources for any further wireless devices, option "Yes" in step 136 in FIG. 2b, the network node may yet further adjust the beam such that a fourth (extended) set of one or more additional wireless devices not within transmission range of previously further adjusted beam are within transmission range of yet the further adjusted beam. This is indicated as going back to step 135. It is pointed out that even though the text of box 135 mentions first, second and third set of one or more additional devices, the network node may loop steps 135 and 136 and further adjusting the beam for further additional sets of wireless devices until there are no more physical layer resources available for accommodating the wireless devices of the respective sets of respective one or more wireless devices, i.e. until the option of step 136 is "No" and the network node determines if the last adjusted beam is may accommodate the wireless device.

The method may further comprise, after adjusting the selected beam or further adjusting any previously adjusted beam, updating a Modulation and Coding Scheme, MCS, for the set(s) of wireless devices within transmission range of the previously selected beam.

When any beam is adjusted, the channel quality may change. In order for the transmission between the network node and the wireless devices to be likely to be successful using an adjusted or further adjusted beam, the network node may update the MCS for the set(s) of wireless devices within transmission range of the previously selected or adjusted beam. In this manner, the MCS may be more suitable for the transmission with regard to the beam to be used. This is not indicated as a separate method step in FIG. 2a or 2b, however it could be a separate step or it could be part of either steps 130 or 135 or steps 131 or 136.

The method may further comprise, determining if there are enough physical layer resources resource for transmission between the network node and the set(s) of wireless devices using the adjusted or further adjusted beam respectively with regard to the updated MCS.

Due to the adjusted beam, the network node may update the MCS for the set(s) of wireless devices as described above. Generally, a more aggressive MCS will be needed since the channel quality of the transmission may be somewhat worse for a beam that is adjusted compared to a previous beam. In other words, the (or further) adjusted beam may require a reduction in code rate, e.g. by means of the adjusted MCS, in order to compensate for a possible worse SINR as compare to the initially selected beam and/or a previously adjusted beam. Consequently, the data or information of the transmission may require more resources using the adjusted beam for the transmission than using the initially selected or previously adjusted beam.

A more aggressive MCS generally requires more resources wherein the total amount of resources for the transmission of data increases as the beam is adjusted. Consequently, once the network node adjusts a previous beam, i.e. according to above adjusts the initially selected beam or further adjust a previously adjusted beam, the network node may determine if there are enough physical layer resources resource for transmission between the network node and the set(s) of wireless devices using the adjusted or further adjusted beam respectively with regard to the updated MCS. This is implicitly illustrated in FIGS. 2a and 2b by steps 132 and 137 respectively. In the case that an adjusted or further adjusted beam may not be used e.g. due to the decreased code rate, more aggressive MCS, the network node has to revert to the previous beam that can be used for the transmission and perform the transmission using that beam.

The physical layer resources may be, or comprise, frequency resources.

There are different examples of what the physical layer resources comprise: it depends on the technology used for the radio communication. In e.g. $4^{th}$ Generation, 4G, wireless communication networks and/or 5G, the physical layer resources may comprise frequency resources.

For example, the physical layer resources may comprise time resources and frequency resources, wherein one time resource is associated with a plurality of frequency resources. Then one transmission may comprise one or more time resources and respective associated plurality of frequency resources.

There are both digital and analogue beamforming. With analogue beamforming, there is only one digital signal chain that may use pre-coding, per antenna port assuming the number of antenna ports is equal to the number of layers. The above described method may employ either digital or analogue beamforming.

Low complexity analogue beamforming systems are normally realised by having a set of beams in azimuth and elevation directions, and these beams are normally very narrow in order to obtain maximum antenna gain. The introduction of wider beams as a complement to the analogue narrow beams will increase the flexibility thus it's possible to improve the spectrum utilisation.

The solution may use existing link adaptation, receiver and antenna functionality to derive:
1, The direction(s) to the user expressed in terms of azimuth or elevation angle(s). Feedback or reciprocity based methods may be used for this.
2. The antenna gain(s) needed for each direction of each user. Receiver and link adaptation functionality may be used for this purpose.

The solution may select a beam forming solution that aims at providing an antenna pattern from the antenna array to maximise the spectrum utilisation. The hypothesis evaluation of what beam to select may be based on how much data a wireless device has in the buffer, Signal to Interference and Noise Ratio, SINR, antenna gain and available Physical Resource Blocks, PRBs. See also FIG. 2d.

The solution is described herein focusing on one spatial layer (possibly this layer may comprise two separate layers differing in polarisation, this is a matter of definition), however it may be applied also on multiple layers, also by additional combining building on the features of the solution. In addition, the solution is described for one symbol or TTI, thereby focusing on the bit granularity problem outlined above. Nothing does however prevent the solution from being applied on aggregated symbols, or only on parts of the frequency spectrum.

The network node may keep a context for each wireless device about best beam/s, and have knowledge of difference in antenna gain for the best beam and the wider beams for the hypothesis calculation.

The adjusted beams (which may also be referred to as wider beams) cover a set of the narrow (previous) beams, the beam form is known, i.e. the coverage of the wider beam compared to the narrow beam is defined and loss if selecting a wider beam is known.

Beam selection in analogue beamforming may be achieved by using a feedback based scheme where a wireless device reports best beam and performs the network node/wireless device beam pairing. The beam selection has to be a continuous process to handle mobility, foliage and if beam is changed due to obstacles.

Figure 2E:
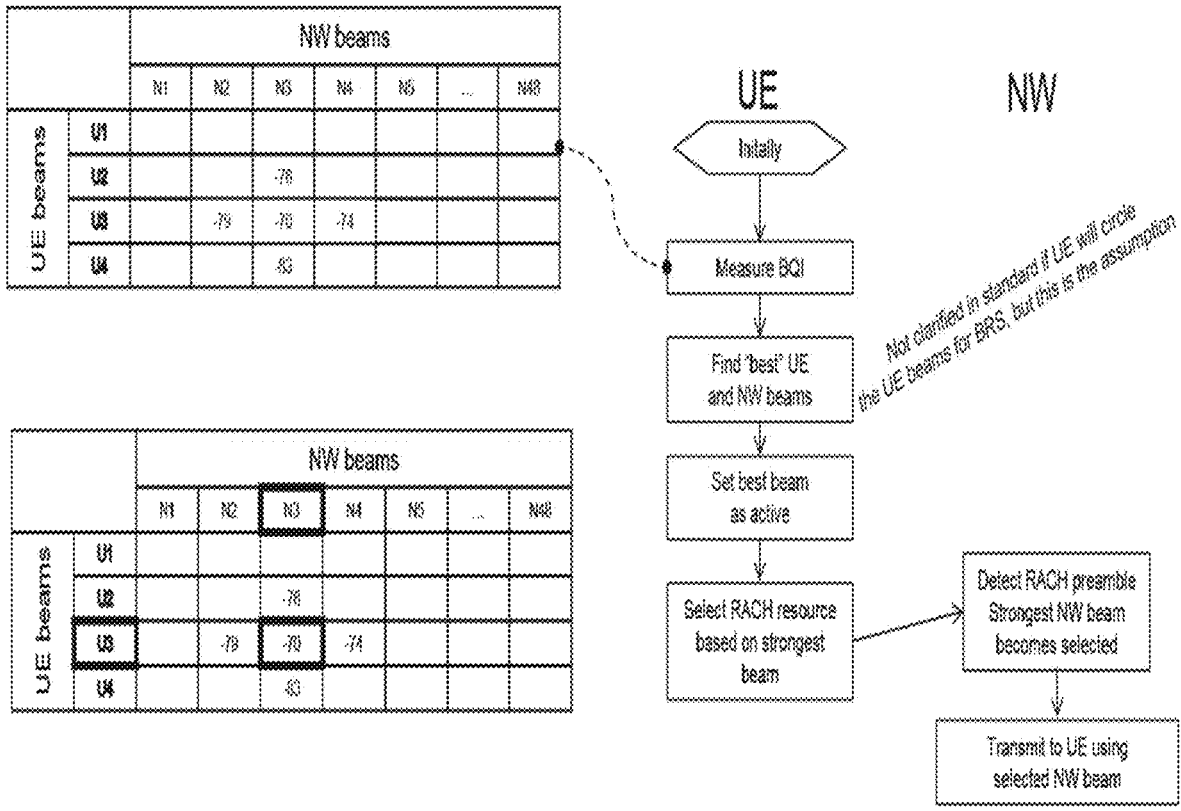
FIG. 2e is an illustration of a wireless device attempting to access a network via a network node.

At initial access to the network (network node) the wireless device reads the broadcast channels and accesses the network through the random access channel. One option is that the network node sweeps the system information and random access channel with possible network beams and the wireless device does a pairing with best wireless devices beam and access the network, via the network node, with that beam combination. The network node will at the Physical Random Access Channel, PRACH, attempt save the used beam and the received SINR in a beam selection context. See FIG. 2e. It is pointed out that in FIG. 2e, the wireless device is referred to as a UE (User Equipment), BRS is mentioned, and e.g. Beam Quality Indication, BQI, is measured according to the flowchart. The nomenclature in the figures is merely examples for illustration and is not limiting. There are different channel quality parameters that may be used in order to determine or estimate a channel quality, e.g. CQI, pathloss, SIR, SNIR etc. in order to select and/or adjust a beam.

Once the wireless device is connected to the network node, the network node may order measurements to get beam updates in order to keep the best beam updated in order to achieve maximum SINR. The measurement may be either event triggered or periodical. At every transmission/reception to/from the wireless device, the beam context and SINR estimate for the selected beam may be updated.

One exemplifying principle for beam evaluation is described below:
1. Select highest prioritised user
   b. Select best beam for that user
   c. Calculate how many PRBs that are necessary for the allocation
   d. If the allocation do not use all available PRBs
      i. If any other user on same selected beam
         1. Schedule user on same beam
         2. Goto c
      ii. Else
         1. Change to wider beam
         2. Calculate how many PRBs that are necessary for the allocation
         3. If the allocation do not use all available PRBs
            a. If any other user on same beam
               i. Schedule user on same beam
               ii. Goto c
   e. Else
      i. Schedule the selected wireless devices on the selected beams.

The user data mapping may be made assuming at least two wireless devices are to be allocated on the resources corresponding to one single symbol on the resource grid.

The frequency allocation may be based on exactly the same principles as Long Term Evolution, LTE. Wireless devices are allocated to different sets of sub-carriers.

The time signal, corresponding to the symbol, may be transmitted in the directions of all wireless devices. This is not optimal, but a big gain as compared to the situation of FIG. 2b. Achieving something better would require a different numerology of the resource grid and/or digital beamforming. But at higher carrier frequencies the latter is not possible.

In order for the wireless device to be able to retrieve the transmitted data in the wireless device, the same control signalling as in LTE may be needed, per direction of a user. This signalling may at least comprise information on (a) the sub-carriers allocated to each wireless device, and (b) the MCS applied for each wireless device.

Figure 2F:
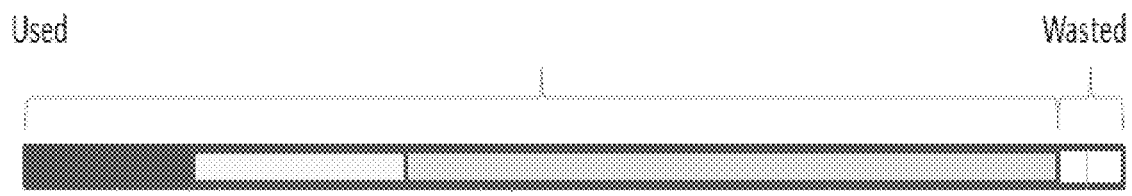
FIG. 2f is an illustration of an exemplifying frequency allocation for analogue beamforming.

The network node may perform frequency allocation of user data and MCS, said allocation being performed per beam direction of said users (wireless devices). See also FIG. 2f.

Embodiments herein also relate to a network node using beamforming for scheduling transmissions between the network node and one or more wireless devices in the same time resource. The network node is operable in a wireless communication system. The network node has the same technical features, objects and advantages as the method performed by the network node. The network node is thus only described in brief in order to avoid unnecessary repetition. The network node will be described with reference to FIGS. 3 and 4.

Figure 3:
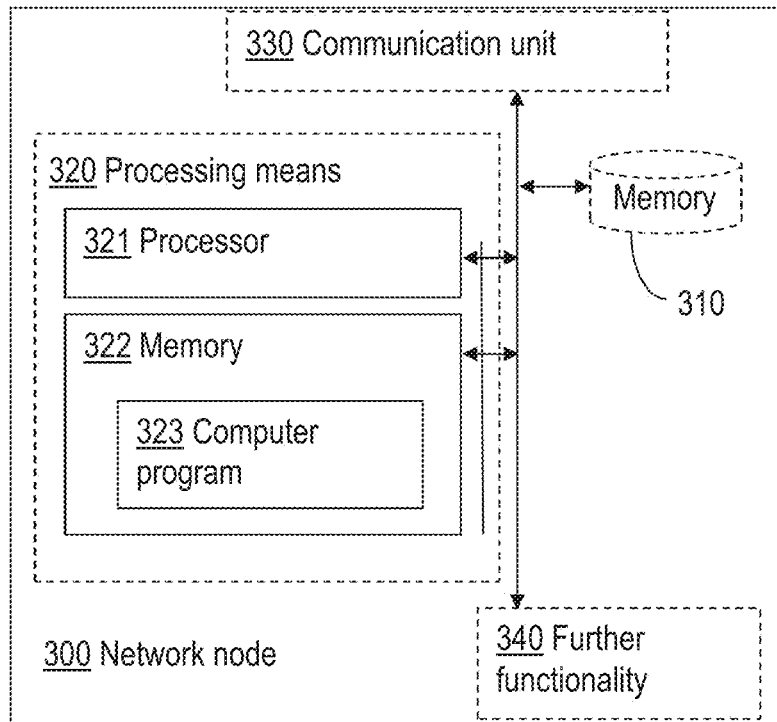
FIG. 3 is a block diagram of a network node for scheduling transmissions between the network node and one or more wireless devices in the same physical layer resources, according to an exemplifying embodiment.
Figure 4:
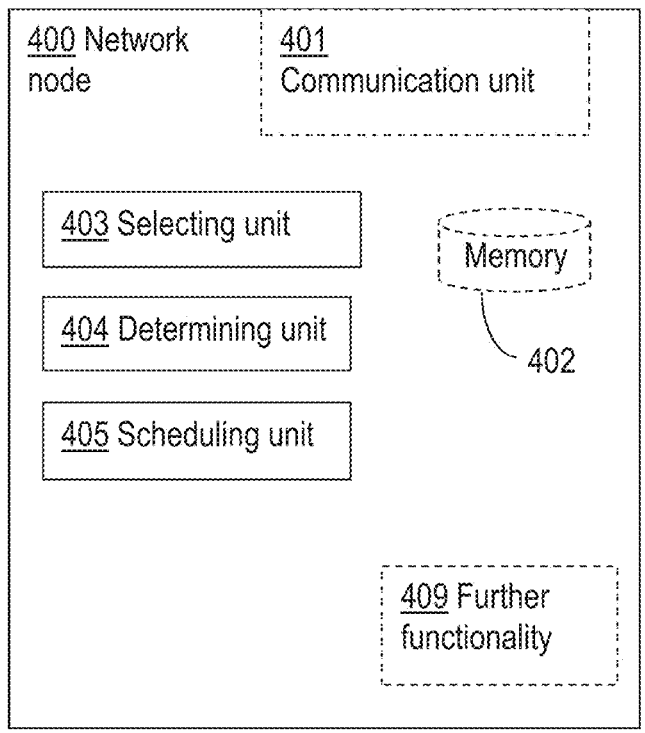
FIG. 4 is a block diagram of a network node for scheduling transmissions between the network node and one or more wireless devices in the same physical layer resources, according to another exemplifying embodiment.

FIGS. 3 and 4 illustrate the network node 300, 400 being configured for selecting a beam for a transmission between the network node and a first one of the wireless devices; and determining if a portion of physical layer resources of the time resource remains available after allocating portions of physical layer resources to a first set of one or more wireless devices within transmission range of the selected beam. The network node 300, 400 is also configured for, if at least a portion of physical layer resources remains available, adjusting the selected beam such that a second set of one or more additional wireless devices not within transmission range of the initially selected beam are within transmission range of the adjusted beam. Still further, the network node 300, 400 is configured for, if no portion of physical layer resources remains available after allocating portions of physical layer resources to the first and second set of wireless devices and if there are enough physical layer resources for transmission between the network node and the first and second sets of wireless devices using the adjusted beam: scheduling transmissions between the network node and the first and second sets of wireless devices using the adjusted beam.

The network node 300, 400 may be implemented or realised in different ways. An exemplifying implementation is illustrated in FIG. 3. FIG. 3 illustrates the network node 300 comprising a processor 321 and memory 322, the memory comprising instructions, e.g. by means of a computer program 323, which when executed by the processor 321 causes the network node 300 to select a beam for a transmission between the network node and a first one of the wireless devices; and to determine if a portion of physical layer resources of the time resource remains available after allocating portions of physical layer resources to a first set of one or more wireless devices within transmission range of the selected beam. The memory 322 further comprises instructions, e.g. by means of a computer program 323, which when executed by the processor 321 causes the network node 300 to, if at least a portion of physical layer resources remains available, adjust the selected beam such that a second set of one or more additional wireless devices not within transmission range of the initially selected beam are within transmission range of the adjusted beam. Still further, the memory 322 further comprises instructions, e.g. by means of a computer program 323, which when executed by the processor 321 causes the network node 300 to, if no portion of physical layer resources remains available after allocating portions of physical layer resources to the first and second set of wireless devices and if there are enough physical layer resources for transmission between the network node and the first and second sets of wireless devices using the adjusted beam: schedule transmissions between the network node and the first and second sets of wireless devices using the adjusted beam.

FIG. 3 also illustrates the network node 300 comprising a memory 310. It shall be pointed out that FIG. 3 is merely an exemplifying illustration and memory 310 may optionally, be a part of the memory 322 or be a further memory of the network node 300 operable in the communication system. The memory may for example comprise information relating to the network node 300, to statistics of operation of the network node 300, just to give a couple of illustrating examples. FIG. 3 further illustrates the network node 300 comprising processing means 320, which comprises the memory 322 and the processor 321. Still further, FIG. 3 illustrates the network node 300 comprising a communication unit 330. The communication unit 330 may comprise an interface through which the network node 300 communicates with other nodes, servers, wireless devices or entities of the communication network. FIG. 3 also illustrates the network node 300 comprising further functionality 340. The further functionality 340 may comprise hardware of software necessary for the network node 300 to perform different tasks that are not disclosed herein.

An alternative exemplifying implementation of the network node 300, 400 is illustrated in FIG. 4. FIG. 4 illustrates the network node 400 comprising a selecting unit 403 for selecting a beam for a transmission between the network node and a first one of the wireless devices and a determining unit 404 for determining if a portion of physical layer resources of the time resource remains available after allocating portions of physical layer resources to a first set of one or more wireless devices within transmission range of the selected beam. FIG. 4 also illustrates the network node 400 comprising an adjusting unit 405 for, if at least a portion of physical layer resources remains available, adjusting the selected beam such that a second set of one or more additional wireless devices not within transmission range of the initially selected beam are within transmission range of the adjusted beam. FIG. 4 also illustrates the network node 400 comprising a scheduling unit 406 for scheduling transmissions between the network node and the first and second sets of wireless devices using the adjusted beam if no portion of physical layer resources remains available after allocating portions of physical layer resources to the first and second set of wireless devices and if there are enough physical layer resources for transmission between the network node and the first and second sets of wireless devices using the adjusted beam.

In FIG. 4, the network node 400 operable in a communication system or network is also illustrated comprising a communication unit 401. Through this unit, the network node 400 is adapted to communicate with other nodes and/or entities in the communication system. The communication unit 401 may comprise more than one receiving arrangement. For example, the communication unit may be connected to both a wire and an antenna, by means of which the network node 400 is enabled to communicate with other nodes and/or entities in the communication network. Similarly, the communication unit 401 may comprise more than one transmitting arrangement, which in turn are connected to both a wire and an antenna, by means of which the network node 400 is enabled to communicate with other nodes and/or entities in the communication network. The network node 400 further comprises a memory 402 for storing data. Further, the network node 400 may comprise a control or processing unit (not shown) which in turn is connected to the different units 403-406. It shall be pointed out that this is merely an illustrative example and the network node 400 may comprise more, less or other units or modules which execute the functions of the network node 400 in the same manner as the units illustrated in FIG. 4.

It should be noted that FIG. 4 merely illustrates various functional units in the network node 400 in a logical sense. The functions in practice may be implemented using any suitable software and hardware means/circuits etc. Thus, the embodiments are generally not limited to the shown structures of the network node 400 and the functional units. Hence, the previously described exemplary embodiments may be realised in many ways. For example, one embodiment includes a computer-readable medium having instructions stored thereon that are executable by the control or processing unit for executing the method steps in the network node 400. The instructions executable by the computing system and stored on the computer-readable medium perform the method steps of the network node 400 as set forth in the claims.

The network node has the same possible advantages as the method performed by the network node. One possible advantage is that the usage of the air interface is flexible and efficient. This is hence achieved by the fact that additional wireless devices can be scheduled in the same time instant, than what would have been possible without the invention. In this way more wireless devices may be served per time unit, a fact that is also beneficial to keep the round trip latency low, in more heavily loaded situations than would be possible without the invention.

According to an embodiment, the network node 300, 400 is further configured for scheduling transmissions between the network node and the first set of wireless devices using the initially selected beam if a portion of physical layer resources is not available after allocating portions of physical layer resources to the first set of one or more wireless devices within transmission range of the selected beam.

According to yet an embodiment, the network node 300, 400 is further configured for selecting the beam by selecting the beam based on a channel quality of a link the selected beam provides between the network node and the first wireless device.

According to still an embodiment, the network node 300, 400 is further configured for determining if a portion of the time resource would remain available after an allocation of available physical layer resources in the time resource based on at least one of (a) channel quality, and (b) available power and antenna resources.

According to a further embodiment, the network node 300, 400 is further configured for determining if a portion of physical layer resources of the time resource remains available after allocating portions of physical layer resources to the first and second set of one or more wireless devices within transmission range of the adjusted beam. If at least a portion of physical layer resources remains available, further adjusting the previously adjusted beam such that a third set of one or more additional wireless devices not within transmission range of the previously adjusted beam are within transmission range of the further adjusted beam; and scheduling transmissions between the network node and the first, second and third set of wireless devices using the further adjusted beam if no portion of physical layer resources remains available and if there are enough physical layer resources for transmission between the network node and the first, second and third sets of wireless devices using the further adjusted beam.

According to another embodiment, the network node 300, 400 is further configured for, after adjusting the selected beam or further adjusting any previously adjusted beam, updating a Modulation and Coding Scheme, MCS, for the set(s) of wireless devices within transmission range of the previously selected beam.

According to yet an embodiment, the network node 300, 400 is further configured for determining if there are enough physical layer resources of the time resource for transmission between the network node and the set(s) of wireless devices using the adjusted or further adjusted beam respectively with regard to the updated MCS.

According to still an embodiment, the physical layer resources are, or comprise, frequency resources.

Figure 5:
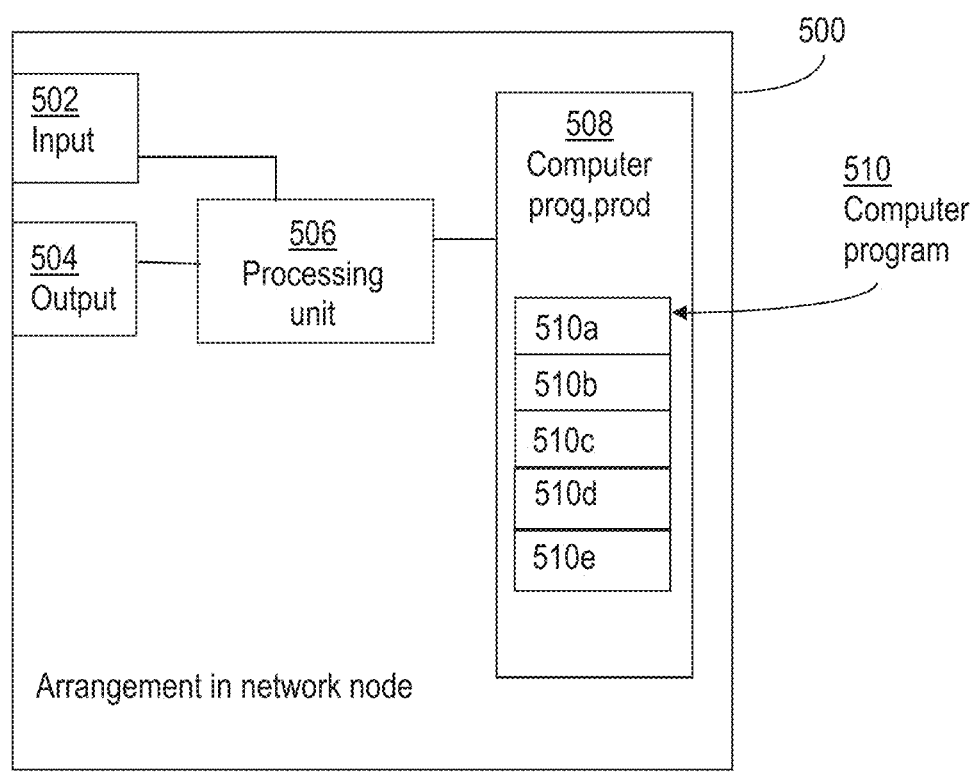
FIG. 5 is a block diagram of an arrangement in a FIG. 3 is a block diagram of a network node for scheduling transmissions between the network node and one or more wireless devices in the same physical layer resources, according to an exemplifying embodiment.

FIG. 5 schematically shows an embodiment of an arrangement 500 in a network node 400 operable in a first communication network. Comprised in the arrangement 500 in the network node 400 are here a processing unit 506, e.g. with a DSP. The processing unit 506 may be a single unit or a plurality of units to perform different actions of procedures described herein. The arrangement 500 in the network node 400 may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement 500 in the network node 400 comprises at least one computer program product 508 in the form of a non-volatile memory, e.g. an EEPROM, a flash memory and a hard drive. The computer program product 508 comprises a computer program 510, which comprises code means, which when executed in the processing unit 506 in the arrangement 500 in the network node 400 in the communication network causes the network node 400 to perform the actions e.g. of the procedure described earlier in conjunction with FIG. 1a-1b.

The computer program 510 may be configured as a computer program code structured in computer program modules 510a-510e. Hence, in an exemplifying embodiment, the code means in the computer program of the arrangement 500 in the network node 400 comprises a selecting unit, or module, for selecting a beam for a transmission between the network node and a first one of the wireless devices, and a determining unit, or module, for determining if a portion of physical layer resources of the time resource remains available after allocating portions of physical layer resources to a first set of one or more wireless devices within transmission range of the selected beam. The computer program further comprises an adjusting unit, or module, for adjusting the selected beam such that a second set of one or more additional wireless devices not within transmission range of the initially selected beam are within transmission range of the adjusted beam if at least a portion of physical layer resources remains available. The computer program still further comprises a scheduling unit, or module, for scheduling transmissions between the network node and the first and second sets of wireless devices using the adjusted beam if no portion of physical layer resources remains available after allocating portions of physical layer resources to the first and second set of wireless devices and if there are enough physical layer resources for transmission between the network node and the first and second sets of wireless devices using the adjusted beam.

The computer program modules could essentially perform the actions of the flow illustrated in FIGS. 1a-1b, to emulate the network node 400 operable in the communication network. In other words, when the different computer program modules are executed in the processing unit 506, they may correspond to the units 403-406 of FIG. 4.

Although the code means in the respective embodiments disclosed above in conjunction with FIG. 4 is implemented as computer program modules which when executed in the processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the embodiments of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node using beamforming for scheduling transmissions between the network node and one or more wireless devices in the same physical layer resources, the network node being operable in a wireless communication system, the method comprising:
   selecting a beam for a transmission between the network node and a first one of the wireless devices,
   determining if a portion of physical layer resources remains available after allocating portions of physical layer resources to a first set of one or more wireless devices within transmission range of the selected beam;
   if at least a portion of physical layer resources remains available, adjusting the selected beam such that a second set of one or more additional wireless devices not within transmission range of the initially selected beam are within transmission range of the adjusted beam,
   if no portion of physical layer resources remains available after allocating portions of physical layer resources to the first and second set of wireless devices and if there are enough physical layer resources for transmission between the network node and the first and second sets of wireless devices using the adjusted beam: scheduling transmission(s) between the network node and the first and second sets of wireless devices using the adjusted beam.

2. The method according to claim 1, further comprising scheduling transmissions between the network node and the first set of wireless devices using the initially selected beam if a portion of physical layer resources is not available after allocating portions of physical layer resources to the first set of one or more wireless devices within transmission range of the selected beam.

3. The method according to claim 1, wherein the selecting of the beam comprises selecting the beam based on a channel quality of a link the selected beam provides between the network node and the first wireless device.

4. The method according to claim 1, wherein the determining if a portion of the physical layer resources would remain available after an allocation of available physical layer resources is based on at least one of (a) channel quality, and (b) available power and antenna resources.

5. The method according to claim 1, further comprising
determining if a portion of physical layer resources
remains available after allocating portions of physical
layer resources to the first and second set of one or
more wireless devices within transmission range of the
adjusted beam,
if at least a portion of physical layer resources remains
available, further adjusting the previously adjusted
beam such that a third set of one or more additional
wireless devices not within transmission range of the
previously adjusted beam are within transmission range
of the further adjusted beam, and
scheduling transmissions between the network node and
the first, second and third set of wireless devices using
the further adjusted beam if no portion of physical layer
resources remains available and if there are enough
physical layer resources for transmission between the
network node and the first, second and third sets of
wireless devices using the further adjusted beam.

6. The method according to claim 1, after adjusting the selected beam or further adjusting any previously adjusted beam, updating a Modulation and Coding Scheme, MCS, for the set(s) of wireless devices within transmission range of the previously selected beam.

7. The method according to claim 6, further comprising determining if there are enough physical layer resources for transmission between the network node and the set(s) of wireless devices using the adjusted or further adjusted beam respectively with regard to the updated MCS.

8. The method according to claim 1, wherein the physical layer resources comprise frequency resources.

9. A network node using beamforming for scheduling transmissions between the network node and one or more wireless devices in the same physical layer resources, the network node being operable in a wireless communication system, the network node being configured for:
 selecting a beam for a transmission between the network node and a first one of the wireless devices,
 determining if a portion of physical layer resources remains available after allocating portions of physical layer resources to a first set of one or more wireless devices within transmission range of the selected beam;
 if at least a portion of physical layer resources remains available, adjusting the selected beam such that a second set of one or more additional wireless devices not within transmission range of the initially selected beam are within transmission range of the adjusted beam,
 if no portion of physical layer resources remains available after allocating portions of physical layer resources to the first and second set of wireless devices and if there are enough physical layer resources for transmission between the network node and the first and second sets of wireless devices using the adjusted beam: scheduling transmissions between the network node and the first and second sets of wireless devices using the adjusted beam.

10. The network node according to claim 9, further being configured for scheduling transmissions between the network node and the first set of wireless devices using the initially selected beam if a portion of physical layer resources is not available after allocating portions of physical cal layer resources to the first set of one or more wireless devices within transmission range of the selected beam.

11. The network node according to claim 9, being configured for selecting the beam by selecting the beam based on a channel quality of a link the selected beam provides between the network node and the first wireless device.

12. The network node according to claim 9, being configured for determining if a portion of the physical layer resources would remain available after an allocation of available physical layer resources based on at least one of (a) channel quality, and (b) available power and antenna resources.

13. The network node according to claim 9, further being configured for:
 determining if a portion of physical layer resources remains available after allocating portions of physical layer resources to the first and second set of one or more wireless devices within transmission range of the adjusted beam,
 if at least a portion of physical layer resources remains available, further adjusting the previously adjusted beam such that a third set of one or more additional wireless devices not within transmission range of the previously adjusted beam are within transmission range of the further adjusted beam, and
 scheduling transmissions between the network node and the first, second and third set of wireless devices using the further adjusted beam if no portion of physical layer resources remains available and if there are enough physical layer resources for transmission between the network node and the first, second and third sets of wireless devices using the further adjusted beam.

14. The network node according to claim 9, configured for, after adjusting the selected beam or further adjusting any previously adjusted beam, updating a Modulation and Coding Scheme, MCS, for the set(s) of wireless devices within transmission range of the previously selected beam.

15. The network node according to claim 14, further being configured for determining if there are enough physical layer resources for transmission between the network node and the set(s) of wireless devices using the adjusted or further adjusted beam respectively with regard to the updated MCS.

16. The network node according to claim 9, wherein the physical layer resources comprise frequency resources.

17. A non-transitory computer readable medium comprising computer readable code which, when run in a processing unit comprised in an arrangement in a network node using beamforming for scheduling transmissions between the network node and one or more wireless devices in the same physical layer resources, causes the network node to perform a method comprising:
 selecting a beam for a transmission between the network node and a first one of the wireless devices,
 determining if a portion of physical layer resources remains available after allocating portions of physical layer resources to a first set of one or more wireless devices within transmission range of the selected beam;
 if at least a portion of physical layer resources remains available, adjusting the selected beam such that a second set of one or more additional wireless devices not within transmission range of the initially selected beam are within transmission range of the adjusted beam,
 if no portion of physical layer resources remains available after allocating portions of physical layer resources to the first and second set of wireless devices and if there are enough physical layer resources for transmission between the network node and the first and second sets of wireless devices using the adjusted beam: scheduling transmission(s) between the network node and the first and second sets of wireless devices using the adjusted beam.

\* \* \* \* \*